April 25, 1944. R. G. AURIEN 2,347,387
ROTOR BRAKE
Filed Jan. 30, 1941 4 Sheets-Sheet 2
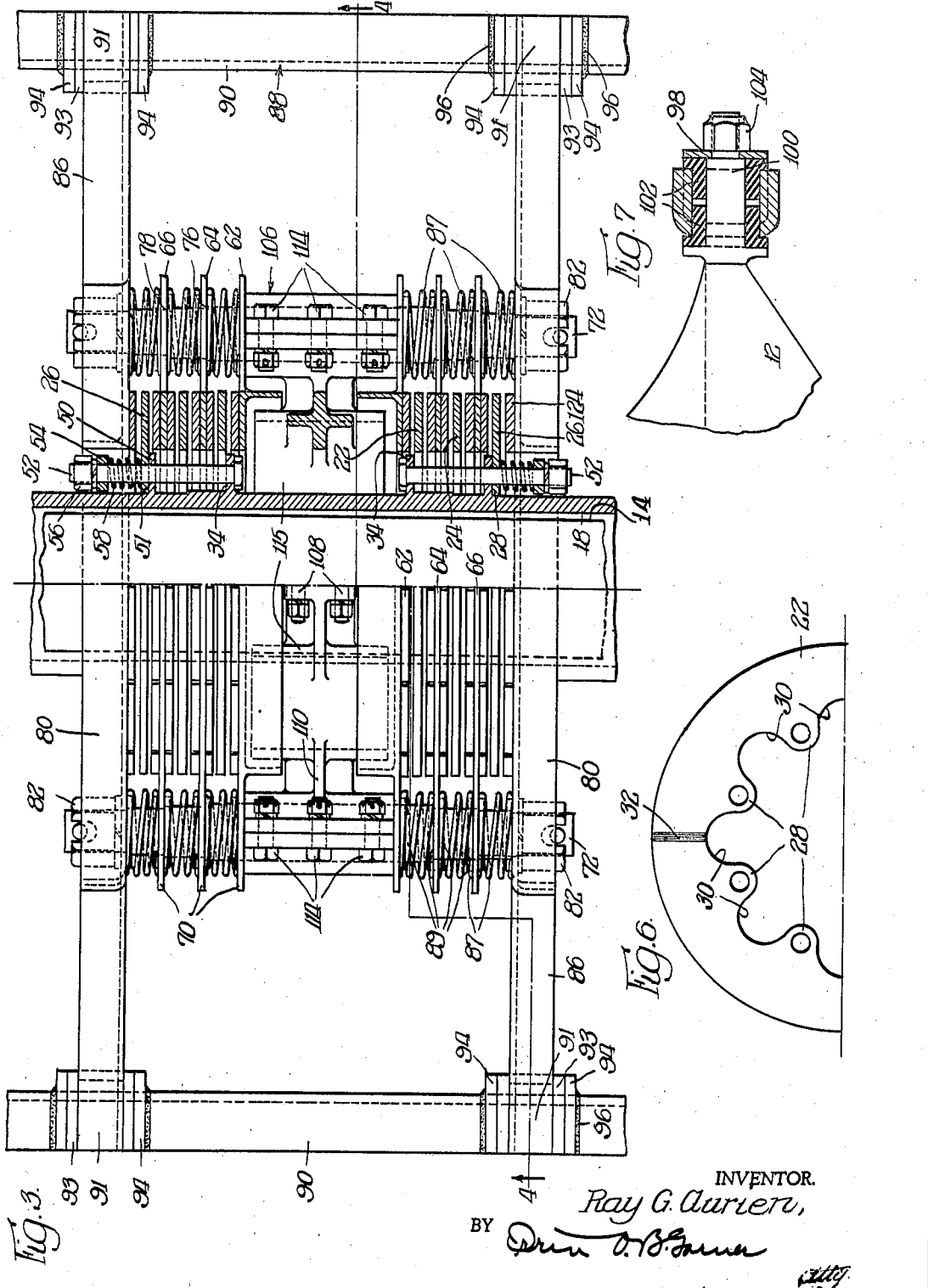
INVENTOR.
Ray G. Aurien,
BY

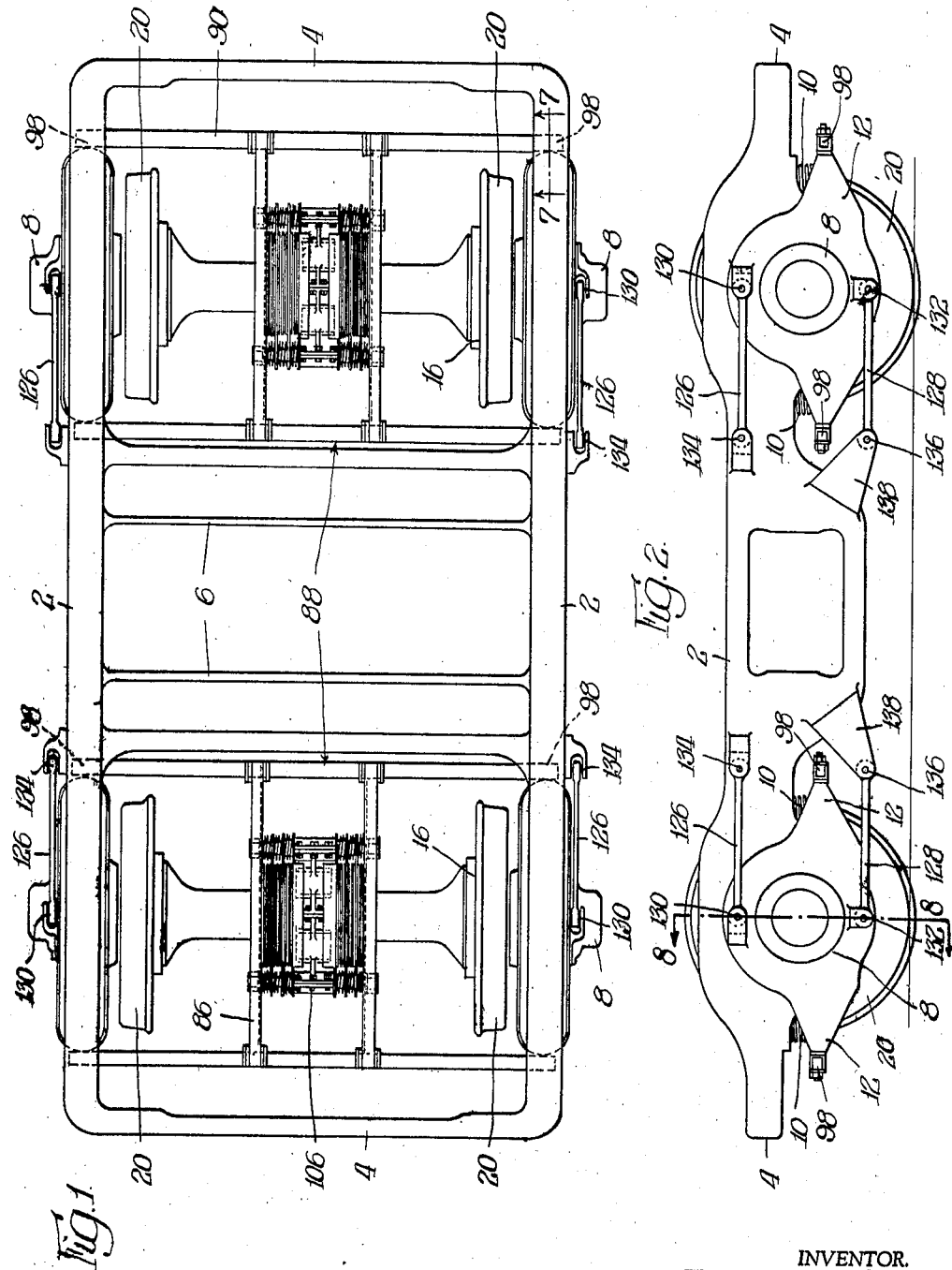

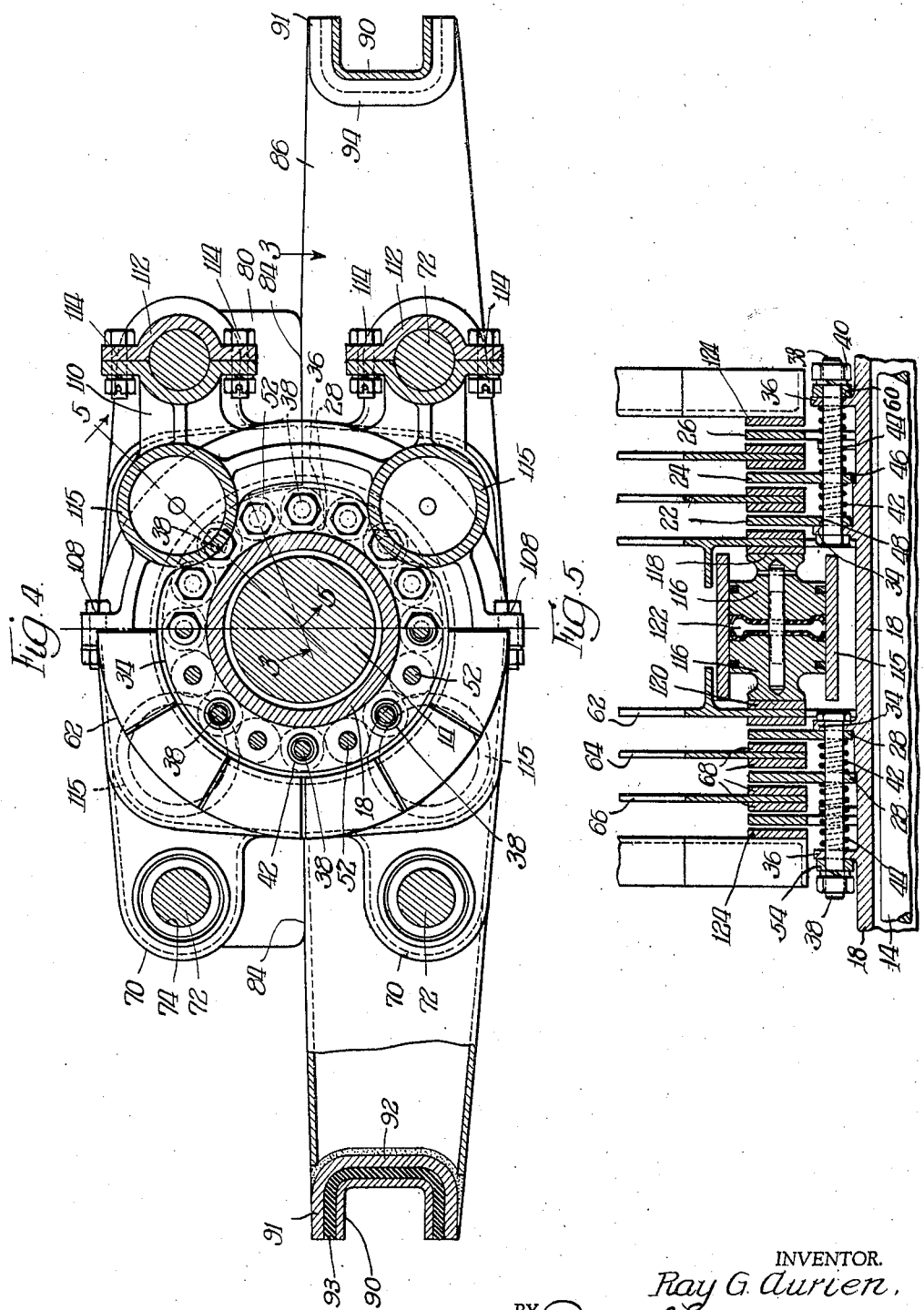

April 25, 1944.  R. G. AURIEN  2,347,387
ROTOR BRAKE
Filed Jan. 30, 1941  4 Sheets-Sheet 4

Inventor:
RAY G. AURIEN,
By
Attorney

Patented Apr. 25, 1944

2,347,387

UNITED STATES PATENT OFFICE 2,347,387

ROTOR BRAKE

Ray G. Aurien, Chicago, Ill., assignor to American Steel Foundries, Chicago, Ill., a corporation of New Jersey Application January 30, 1941, Serial No. 376,624

21 Claims. (Cl. 188—59)

This invention relates to a brake arrangement and more particularly to brakes of the disc type comprising rotors and stators disposed for frictional engagement with each other between the wheels of a railway wheel and axle assembly.

Generally speaking, my invention comprehends the application of such a disc brake to a roller bearing wheel and axle assembly of well-known form.

An object of my invention is to devise such a disc brake wherein the rotors are supported by and driven in rotation with a normally rotating outer axle, and the stators and actuating means are supported by journal means outboard the wheels.

Another object of my invention is to design such a disc brake wherein the stators and actuating means are carried by a brake carrier which is supported from opposite sides of journal boxes outboard the wheels of a railway wheel and axle assembly.

My invention comprehends a disc brake arrangement wherein a plurality of sets of interleaved rotors and stators are operable by power means supported between said sets in such manner that transmission of braking stresses to the axle assembly is reduced to a minimum. My invention also includes novel means for maintaining the rotors and stators of each set in their normal spaced released positions.

Other objects and advantages of my novel invention will be readily apparent from the following drawings, description, and claims.

In the drawings, Figure 1 is a top plan view of a railway car truck embodying my invention.

Figure 2 is a side elevation of the railway car truck shown in Figure 1.

Figure 3 is an enlarged fragmentary plan view, half in section, of one of the braking means shown in Figure 1, the section being taken substantially in the transverse planes indicated by the line 3—3 of Figure 4.

Figure 4 is a sectional view of the braking means shown in Figure 3, the section being taken substantially in the vertical plane indicated by the lines 4—4 of Figure 3.

Figure 5 is a fragmentary sectional view taken substantially in a diagonal transverse plane indicated by the line 5—5 of Figure 4.

Figure 6 is a fragmentary side elevation of one of the rotors used in the braking means shown in Figure 3.

Figure 7 is a fragmentary sectional view taken substantially in the vertical longitudinal plane indicated by the line 7—7 of Figure 1.

Figure 8:
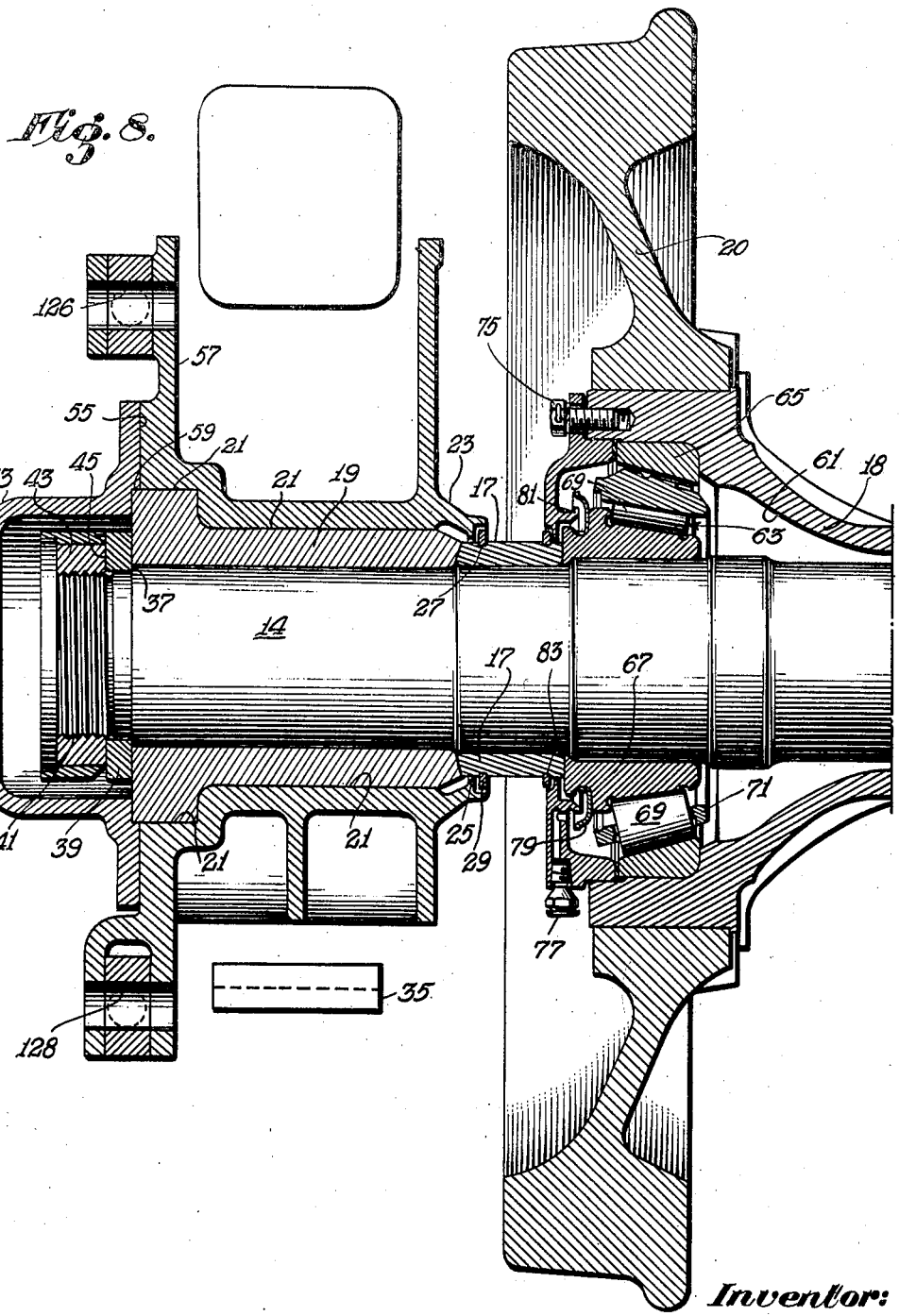
Figure 8 is a reduced fragmentary sectional view taken in the transverse vertical plane indicated by the line 8, 8 of Figure 2 and bisecting a wheel and axle assembly and the supporting journal box.

For the purpose of clarity certain details are omitted from each figure when they are more clearly shown in other figures.

The conventional car truck shown in Figure 1 includes spaced side frames 2, 2, end rails 4, 4, and intermediate spaced transoms 6, 6 between which may be supported a bolster (not shown) in customary manner. Adjacent to each end, the side frames 2, 2 are resiliently supported from axle boxes or journal means generally designated 8, 8 by coil springs 10, 10 disposed on opposite sides of said journal means and interposed between the top member of the side frame 2 and wing portions 12, 12 projecting outwardly from opposite sides of the axle boxes or journal means 8, 8. Accommodated within each journal means 8 may be the outboardly projecting end of a normally nonrotating inner axle 14 of a well-known type of roller bearing wheel and axle assembly generally indicated at 16. Sleeved over the nonrotating inner axle 14 is the normally rotating outer axle 18 having wheels 20, 20 press-fitted on opposite ends in usual manner. Roller bearings (not shown) are interposed between the rotating outer axle and nonrotating inner axle adjacent to each wheel in well-known manner.

Adjacent the outboard face of each wheel 15, a collar 17 is shrunk on the inner axle and positioned on said axle and abutting the outboard face of said collar is a sleeve 19 of nonferrous metal. Seated on said sleeve as at 21, 21 is the journal box 57 comprising an inboard annular flange 23 encircling the shrunk collar 17 as at 25. A snap type baffle ring 29 is positioned on the shrink collar as at 27 and serves to keep foreign material from between the journal box and the sleeve 19. A strap 35 secures the side frame 2 to the journal box in well known manner. Abutting the outboard face of the sleeve 19 and on a shoulder 37 formed on the axle 14 is a retaining ring or washer 39. The outboard end of the axle may be threaded as at 41 and a retaining nut 43 secured thereon in abutment as at 45 with the washer 39. A cover plate 53 abuts the journal box 57 as at 55, is seated upon the sleeve 19 as at 59 and is secured in any convenient manner.

Between each outboard end of the outer axle 18 and the adjacent portion of the inner axle 14 is a bearing cavity 61 and positioned in said cavity is a roller bearing unit generally designated 63 and comprising the outer race 65 fitted within the outer axle, an inner race 67 fitted on the inner axle, and a series of rollers 69, 69 between said races and held in spaced relationship by a cage 71. The outboard end of the cavity 61 is sealed by a closure plate 73 bolted to the outer axle as at 75 and provided with an "alemite" fitting at 77 whereby the roller bearing unit may be conveniently lubricated. Escape of lubricant from the cavity 61 is prevented by the labyrinthian passage defined by the oil flinger 79 secured on the inner race in any convenient manner, by the inwardly directed flange 81 on the cover plate, and by the snap type baffle ring 83 on the shrink collar 17.

My novel braking means is arranged centrally between the wheels 20, 20 and comprises two sets of interleaved rotor means and stator means disposed on opposite sides of the longitudinal center line of the car truck. The rotor means comprises inboard rotors 22, 22, intermediate rotors 24, 24, and outboard rotors 26, 26 each comprising an annular steel disc having a generally scalloped inner circumference defined by spaced ears 28, 28 (Figure 6) and intervening recesses 30, 30. Each of said rotors may be formed in two complementary sections to facilitate assembling and may be welded together as at 32. Encircling the normally rotating outer axle 18 and integrally formed therewith is an annular inboard flange 34, and spaced outboardly therefrom and also integrally formed around said outer axle are a series of spaced lugs 36, 36. Extending through aligned openings in the inboard annular flange 34, the ears 28, 28 of rotors 22 and 24, and spaced outboard lugs 36, 36 may be the rotor supporting or driving bolts 38, 38 having threaded engagement at their outboard ends with the retaining nuts 40, 40.

The rotors 22 and 24 are afforded axial movement along the rotor supporting bolts 38, 38, and sleeved over each bolt 38 may be release springs 42 and 44. Each release spring 44 is interposed between the outboard lug 36 and the ear 28 on the intermediate rotor 24 for maintaining said rotor 24 in abutment as at 46 with an annular shoulder formed on said axle 18. Each release spring 42 is interposed between the inboard and intermediate rotors 22 and 24 for maintaining the inboard rotor in abutment with the inboard annular flange 34 as at 48.

The outboard rotor 26 is disposed with its ears 28, 28 in abutment as at 51 (Figure 3) with spaced lugs 50, 50 integrally formed on the outer axle 18, said lugs being spaced in alternate arrangement with the outboard lugs 36, 36. Rotor supporting bolts 52, 52 for the outboard rotor 26 extend through aligned openings in the inboard flange 34, the lugs 50, 50, the ears 28, 28 on the outboard rotor 26, and a steel ring 54 for threaded engagement with a retaining nut 56. A release spring 58 is sleeved over each bolt 52 between the ring 54 and the rotor 26 for maintaining said outboard rotor in abutment at 51 with each lug 50. The ears 28, 28 on the outboard rotor 26 are spaced with respect to the ears 28, 28 on the inboard and intermediate rotors 22 and 24 so that the rotor supporting bolts 38, 38 extend through the recesses 30, 30 in the outboard rotor 26 and are afforded clearance therefrom. Likewise the rotor supporting bolts 52, 52 extend through the recesses 30, 30 in the inboard and intermediate rotors 22 and 24 and are afforded clearance therefrom. The ring 54 is positioned against the outboard lugs 36, 36 as at 60, 60 by the retaining nuts 40, 40 on the rotor supporting bolts 38, 38.

Interleaved with and disposed for annular face engagement with said rotors are inboard stators 62, 62, intermediate stators 64, 64, and outboard stators 66, 66, said stators having secured to their opposite faces in any convenient manner wear plates 68, 68 of any suitable braking material. Each stator 62, 64, and 66 may be formed in two complementary sections to facilitate assembly and are afforded vertically spaced outwardly projecting arms 70, 70 (Figure 4) at each side of the wheel and axle assembly. Axially extending stator supporting pins or bolts 72, 72 project through aligned openings 74, 74 in the arms 70, 70, each bolt 72 being formed at opposite ends with annular shoulders 76, 76 and 78, 78 affording stop means in released position for the respective stators 64 and 66. The upper set of stator supporting bolts 72, 72 extend through top backing plates 80, 80 for threaded engagement at their opposite ends with the securing nuts 82, 82, said backing plates 80, 80 extending above and over the axle assembly and secured in any convenient manner at 84, 84 to the longitudinal channel-like members 86, 86 extending below the axle assembly. The bottom set of stator supporting bolts 72, 72 extend in similar manner through the longitudinal members 86, 86 for threaded engagement with retaining nuts.

Interposed between each stator 62 and 64, 64 and 66, and 66 and the respective backing plate 80 and longitudinal member 86 are release springs 87, 87 which maintain said stators 64 and 66 in their normal released positions against the shoulders 76 and 78. Positioning means for said release springs 87, 87 are afforded by annular washers 89, 89 secured in any convenient manner to the arms 70, 70 and the respective backing plates 80, 80 and longitudinal members 86, 86.

In addition to the spaced longitudinal members 86, 86, the brake carrier device generally indicated at 88 includes spaced transverse channel members 90, 90 on opposite sides of each wheel and axle assembly 16. The end of each longitudinal member 86 is in the form of a jaw 91 formed by a U-shaped member 92 welded to the end of said longitudinal member. Said jaw accommodates the adjacent channel member 90, and interposed between said channel member 90 and the jaw-like end is a resilient pad 93 of channel section which is confined between plates 94, 94 secured in any convenient manner to the member 90 as by welding at 96.

The transverse members 90, 90 embrace the adjacent wheel and axle assembly 16 and extend outboard the wheels for connection as at 98 to the wing portions 12, 12 of the journal means 8, 8. Each wing portion is afforded an outwardly projecting bolt-like lug 100 (Figure 7) which extends through the adjacent end of the channel member 90. Interposed between said lug 100 and said channel member are flanged resilient bushings 102, 102 affording a resilient support for the brake carrier 88. A securing nut 104 is threaded on the end of the bolt-like lug 100.

Between the two sets of stators and rotors and at approximately the longitudinal center line of the car truck is supported the brake cylinder device or actuating means generally indicated at 106. Said brake cylinder device comprises two complementary sections secured together above and below the axle assembly at 108, 108 as by nut and bolt assemblies, and said device is afforded vertically spaced outwardly projecting brackets 110, 110 which accommodate the central portion of the stator supporting bolts 72, 72. A clamp 112 is secured to each bracket 110 by nut and bolt assemblies 114 for securing the brake cylinder device on the stator supporting bolts 72, 72. The brake cylinder device 106 includes four double acting brake cylinders 115, 115 each having pistons 116, 116 operable in opposite directions. Each piston 116 abuts as at 118 the insulating material 120 secured in any convenient manner to the inboard stator 62.

In operation fluid is injected into the pressure chamber 122 causing the pistons 116, 116 to move outboardly in opposite directions and to urge the interleaved rotors and stators axially into compact piles against annular wear plates 124, 124 secured in any convenient manner to the top backing plates 80, 80 and the longitudinal members 86, 86. Upon release of the actuating means the rotors and stators are returned to their normal released positions by the rotor and stator release springs previously described.

Torque stresses are transmitted through the brake carrier device 88 to the journal means 8, 8 and then to the truck frame by top and bottom torque arms 126, 126 and 128, 128 respectively which are secured to said journal means as at 130, 130 and 132, 132 respectively above and below the axle. Each top torque arm 126 is secured to the top compression member of the side frame as at 134, and each bottom torque arm 128 is secured as at 136 to a downwardly projecting bracket 138 formed on the bottom tension member of the side frame. The journal means 8, 8 are thus held against rotation or tipping because of torque stresses.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway vehicle, a truck frame, a supporting wheel and axle assembly including an inner nonrotating axle, an outer rotating axle sleeved thereover with wheels thereon, axle boxes on said inner axle outboard said wheels, brake supporting means embracing said assembly and supported by said axle boxes, braking means between said wheels including rotors driven by said outer rotating axle, stators disposed for frictional engagement with said rotors and carried by said brake supporting means, power means on said brake supporting means for actuating said braking means, and members connected above and below said axle to said axle boxes and to said truck frame for holding said axle boxes against rotation.

2. In a railway vehicle, a truck frame, a supporting wheel and axle assembly including an inner nonrotating axle, an outer rotating axle sleeved thereover with wheels thereon, axle boxes on said inner axle outboard said wheels, brake supporting means encircling said axles and supported by said axle boxes at opposite sides thereof, braking means between said wheels including rotors driven by said outer rotating axle, stators disposed for frictional engagement with said rotors and carried by said brake supporting means, and power means on said brake supporting means for actuating said braking means, and torque transmitting means connected to said boxes and said frame.

3. In a brake arrangement, a vehicle frame, a supporting wheel and axle assembly comprising inner and outer axles and wheels fitted on said outer axle, axle boxes on the ends of said inner axle, each of said boxes having oppositely projecting portions extending therefrom, a brake frame comprising spaced transverse members, each being clamped at opposite ends thereof on corresponding projecting portions of said boxes, and spaced longitudinal members secured at opposite ends thereof to said transverse members, rotor and stator means slidably supported respectively from said outer axle and from said longitudinal members, and power means for urging said rotor and stator means into piles against said longitudinal members.

4. In a brake arrangement, a wheel and axle assembly, journal means at the ends thereof, a brake frame supported from said means, rotor and stator means supported respectively from said assembly and said frame, power means for axially urging said rotor and stator means into engagement, and means on said frame formed and arranged to receive the axial force of said power means against said rotor and stator means.

5. In a brake arrangement, a vehicle frame, a supporting wheel and axle assembly comprising inner and outer axles and wheels fitted on said outer axle, axle boxes on the ends of said inner axle, a brake frame comprising transverse members parallel with the axis of said assembly and supported from said boxes, and longitudinal members supported from said transverse members, power means supported from said longitudinal members, and alternately arranged rotors and stators at opposite sides of said power means, said rotors and stators being supported respectively from said outer axle and said longitudinal members and being adapted to be urged by said power means into piles against respective longitudinal members.

6. In a brake arrangement, a vehicle frame, a supporting wheel and axle assembly comprising inner and outer axles and wheels fitted on said outer axle, axle boxes on the ends of said inner axle, a brake frame comprising spaced members extending transversely of said frame and supported by said boxes, and spaced members extending longitudinally of said frame and supported by said first-mentioned members, spaced pins at opposite sides of said assembly and mounted on said longitudinally extending members, rotors and stators supported respectively from said outer axle and from said pins, said rotors and stators being slidable transversely of said frame, and power means for urging said rotors and stators into braking engagement.

7. In a brake arrangement, a vehicle frame, a supporting wheel and axle assembly comprising inner and outer axles and wheels fitted on said outer axle, axle boxes on the ends of said inner axle, a brake frame supported from said boxes and comprising spaced parallel members extending longitudinally of said vehicle frame, rotors supported from said outer axle, and stators and power means supported from said parallel members, said power means being operable to urge said rotors and stators into frictional engagement against respective parallel members.

8. In a brake arrangement, a wheel and axle assembly comprising inner and outer axles and wheels on said outer axle, an integral flange and spaced integral lugs on said outer axle, rotors supported from said flange and certain of said lugs, another rotor supported from said flange and other of said lugs, stators interleaved with said rotors, and power means for urging said rotors and stators into frictional engagement.

9. In a railway car truck, frame members, a supporting wheel and axle assembly comprising a rotating axle with wheels thereon, axle boxes outboard said wheels supporting said frame members, braking means between said wheels comprising annular rotatable and nonrotatable braking elements mounted on said axle and said axle boxes respectively, power means carried by said axle boxes for actuating said braking means, and members connected to said axle boxes and said frame members for transmitting torque to said frame members.

10. In a brake arrangement, a wheel and axle assembly, a brake frame supported from adjacent the ends of said assembly, rotors and stators supported respectively from said assembly and said frame, and power means operable to urge said rotors and stators into frictional engagement against a portion of said frame.

11. In a brake arrangement, a vehicle frame, a supporting wheel and axle assembly comprising inner and outer axles and wheels on said outer axle, axle boxes on the ends of said inner axle, a brake frame supported from said boxes, rotors and stators supported respectively from said outer axle and said brake frame, power means for urging said rotors and stators into frictional engagement, and torque transmitting means connected to said boxes and said vehicle frame.

12. In a railway car truck, frame members, a supporting wheel and axle assembly comprising a rotating axle with wheels thereon, axle boxes outboard said wheels supporting said frame members, braking means between said wheels comprising rotors and stators concentric with said axle, said rotors being driven by said axle, said stators being carried by said axle boxes at opposite sides thereof, actuating means supported by said axle boxes for moving said rotors and stators into frictional engagement, and torque transmitting means connected to said boxes and said frame members.

13. In a brake arrangement, a wheel and axle assembly comprising inner and outer axles and wheels fitted on said outer axle, axle boxes on the ends of said inner axle, each of said boxes having oppositely projecting portions extending therefrom, a brake frame clamped on the projecting portions of each box, rotors and stators supported respectively from said outer axle and said frame, and power means operable to urge said rotors and stators into frictional engagement.

14. In a railway car truck, frame members, a supporting wheel and axle assembly comprising a rotating axle with wheels thereon, journal means supporting said members, a brake carrier mounted on said means and comprising transverse members and longitudinal members mounted thereon, and a brake mechanism comprising rotors mounted on said axle, and stators and power means mounted on said longitudinal members, said power means being operable to urge said rotors and stators into braking engagement against said longitudinal members.

15. In a railway car truck, frame members, a supporting wheel and axle assembly comprising a rotating axle with wheels thereon, journal means supporting said members, a brake carrier mounted on said means, and a brake mechanism comprising rotors driven by said axle, and stators and power means resiliently mounted on said carrier, said rotors and stators being arranged to be urged by said power means into engagement against said carrier.

16. In a railway car truck, frame members, a supporting wheel and axle assembly, journal means supporting said members, a brake carrier resiliently mounted on said means, rotors driven by said axle, stators mounted on said carrier, and operable means for urging said rotors and said stators into engagement against said carrier, said operable means being mounted on said carrier.

17. In a railway car truck, frame members, a supporting wheel and axle assembly, journal means supporting said members, a brake carrier mounted on said means and comprising transverse members and longitudinal members resiliently supported thereon, rotor means driven by said axle, and stator and power means mounted on said longitudinal members, said power means being operable to urge said rotor and stator means into piles against said longitudinal members.

18. In a brake arrangement, a wheel and axle assembly comprising inner and outer axles and wheels mounted on said outer axle, an axle box on the end of said inner axle having oppositely projecting portions extending therefrom, rigid means clamped on opposite ends of said projecting portions, a rotor and a stator supported respectively from said outer axle and said rigid means, and power means operable to urge said stator and rotor into frictional engagement.

19. In a brake arrangement for a wheel and axle assembly comprising an axle with a wheel thereon, an integral flange and spaced integral lugs on said axle, rotors supported from said flange and certain of said lugs, another rotor supported from said flange and other of said lugs, stators interleaved with said rotors, and power means for urging said rotors and stators into frictional engagement.

20. In a brake arrangement for a wheel and axle assembly comprising an axle with a wheel thereon, an integral flange and spaced integral lugs on said axle, rotors supported from said flange and certain of said lugs, another rotor supported from said flange and other of said lugs, stators interleaved with said rotors, power means for urging said rotors and stators into frictional engagement, and resilient release means associated with said rotors and stators.

21. In a railway car truck having a frame, a wheel and axle structure including two spaced wheels, and two co-axially aligned axle boxes carried by said structure and carrying said frame, in combination, a brake for said assembly comprising rotor means secured to rotate therewith, stator means adapted to frictionally engage said rotor means to brake said assembly, torque means operative to hold said stator means against rotation, and rigid support means extending between and connected to both of said axle boxes and carrying said stator means independently of said torque means, said boxes being afforded rotational movement about the axis of said wheel and axle structure, said movement being limited by said torque means.

RAY G. AURIEN.